(12) United States Patent
Yamada

(10) Patent No.: US 6,398,405 B1
(45) Date of Patent: Jun. 4, 2002

(54) FIXED-POINT CRUCIBLE, FIXED-POINT TEMPERATURE REALIZING APPARATUS USING THE CRUCIBLE AND TEMPERATURE CALIBRATION METHOD

(75) Inventor: Yoshiro Yamada, Tsukuba (JP)

(73) Assignee: Agency of Industrial Science and Technology, Tokyo (JP)

( * ) Notice: Subject to any disclaimer, the term of this patent is extended or adjusted under 35 U.S.C. 154(b) by 0 days.

(21) Appl. No.: 09/458,990

(22) Filed: Dec. 10, 1999

(30) Foreign Application Priority Data

Dec. 11, 1998 (JP) .......................... 10-375183

(51) Int. Cl.$^7$ .................. G01K 15/00; G01K 19/00
(52) U.S. Cl. ................................. 374/1; 374/2
(58) Field of Search .................. 374/1, 2, 139, 374/157, 179; 250/493.1, 495.1

(56) References Cited

U.S. PATENT DOCUMENTS

| | | | | |
|---|---|---|---|---|
| 3,077,539 A | * | 2/1963 | Blau, Jr. et al. ............... | 374/2 |
| 3,945,629 A | * | 3/1976 | Ragone et al. ................ | 264/5 |
| 4,105,191 A | * | 8/1978 | Charbonnier ............... | 266/275 |
| 4,261,202 A | * | 4/1981 | Kawamoto et al. ......... | 374/139 |
| 4,632,817 A | * | 12/1986 | Yazu et al. ................. | 423/446 |
| 5,183,337 A | * | 2/1993 | Pompei ....................... | 374/2 |
| 5,335,993 A | * | 8/1994 | Marcus et al. ............... | 374/11 |
| 5,356,217 A | * | 10/1994 | Sheffield .................... | 374/25 |
| 5,484,204 A | * | 1/1996 | Damley ...................... | 374/10 |
| 5,608,838 A | * | 3/1997 | Brookley ................. | 250/493.1 |
| 5,980,103 A | * | 11/1999 | Ikuno et al. ................ | 374/5 |
| 6,179,465 B1 | * | 1/2001 | Yam .......................... | 374/2 |

FOREIGN PATENT DOCUMENTS

| | | | | |
|---|---|---|---|---|
| JP | 0131027 | * | 8/1982 | .................. 374/2 |
| JP | 0029725 | * | 2/1986 | .................. 374/2 |
| SU | 0148552 | * | 1/1962 | .................. 374/2 |

OTHER PUBLICATIONS

"Theory and Practice of Radiation Thermometry", pp. 755–756, edited by D. P. DeWitt, et al. A Wiley–Interscience Publication, John Wiley & Sons, Inc. No Date.

"Recommended values of temperature on the International Temperature Scale of 1990 for a selected set of secondary reference points"; R. E. Bedford, et al. Metrologia, 1996, 33, pp. 133–154.

"Traceable Tempeatures—An Introduction to Temperature Measurement and Calibration"; pp. 81–86 & 94–97; J.V. Nicholas, et al.; John Wiley & Sons, No Date.

The International Temperature Scale of 1990 (ITS–90); H. Preston–Thomas Metrologia 27, pp. 3–10 (1990).

Quinn, T.J., "News from the BIPM", *Metrologia*, 1997, 34, p. 187, 192.

*Le System international d'unites*, 7e edition, Bureau international des poids et mesures, 1998, 97–98.

\* cited by examiner

*Primary Examiner*—Diego Gutierrez
*Assistant Examiner*—Yaritza Guadalupe
(74) *Attorney, Agent, or Firm*—Oblon, Spivak, McClelland, Maier & Neustadt, P.C.

(57) ABSTRACT

The present invention is to realize fixed points in a temperature region exceeding the melting point of copper, thereby highly accurately calibrating all the thermometers used in a high temperature region such as a radiation thermometer, a thermocouple, and the like. A fixed-point crucible 1 comprises a crucible composed of carbon and a fixed-point material of high melting point enclosed in the wall of the crucible. The fixed-point material is carbon-metal eutectic structure. The crucible 1 is disposed in a temperature-variable furnace 6, the environmental temperature of the crucible 1 is increased and decreased by the temperature-variable furnace 6, the temperature of the cavity in the crucible 1 at the time is measured with a thermometer 9 and the thermometer 9 is calibrated from the state of the temperature variation measured.

10 Claims, 4 Drawing Sheets

FIXED-POINT CRUCIBLE, FIXED-POINT TEMPERATURE REALIZING APPARATUS USING THE CRUCIBLE AND TEMPERATURE CALIBRATION METHOD

TECHNICAL FIELD OF THE INVENTION

The present invention relates to a fixed-point crucible necessary to calibrate a thermometer, for example, a radiation thermometer, a thermocouple and the like used in a high temperature region exceeding 1000° C., a fixed-point temperature realizing apparatus and a thermometer calibrating method using the apparatus.

RELATED ART

When thermometers are calibrated, a freezing point or a melting point of metal is employed as a defining fixed-point in the temperature region above room temperature. A fixed-point crucible is used as a method of realizing the fixed-point temperature.

Graphite crucibles, in which pure metal is cast as a fixed-point material of high melting point, have been usually used as the fixed-point crucible. A thermometer is calibrated making use of such a phenomenon that when the liquid phase and the solid phase of the fixed-point material coexist in the crucible, the temperature of the crucible is not varied due to latent heat of melting. This phenomenon is realized by placing the fixed-point crucible in a temperature-variable furnace and observing the temperature variation of the crucible when an environmental temperature is increased and decreased (refer to Chapter 7 of "New Edition of Proper Use of Thermometer" edited by Japan Electric Instrument Manufactures' Association and published by Nihon Kogyo Publishing Co. (1997)).

The maximum temperature of the fixed-point temperatures is the copper point of 1085° C. (freezing point of copper), and the temperature scale is defined by extrapolation in the temperature region higher than the copper point.

The temperature scale in the temperature region above the copper point is maintained making use of a radiation thermometer calibrated at one of the fixed points below the copper point or by transferring the radiance temperature to the current of strip lamp which uses a tungsten ribbon as a filament.

To realize the fixed-point temperature in the temperature region above the copper point, there has been attempted to realize the freezing point of palladium (freezing point; 1550° C.) and platinum (freezing point; 1770° C.), and an example where the fixed-point was measured by melting them using an alumina crucible has been reported (refer to Quinn, T. J., Chandler T. R. D.: Temperature, Its Measurement and Control in Science and Industry, Plumb, H. H. (ed.), Vol. 4, part 1, p. 295, Pittsburgh: Instrument Society of America (1972), Coates, P. B., Chandler, T. R. D., Andrews, J. W., High Temperature and High Pressure, Vol. 15, p. 573 (1983)).

Further, there has also been reported a trial for obtaining a fixed-point temperature by using tungsten as a crucible material, melting alumina therein, observing the melting and freezing thereof at 2050° with a radiation thermometer, and using it as a fixed-point(refer to Sakate, H., Sakuna, F. Ono, A. Metrologia, Vol. 32, p 129 (1995)).

Thermocouples have been calibrated by a palladium wire method, in addition to the calibration carried out at the copper point (1085° C.) or the gold point (1064° C.). This is a method of inserting a pure palladium wire as pure metal to the distal end of a thermocouple, increasing the temperature of the wire in a heating furnace and observing melting plateaus when the wire is melted.

On the other hand, a trial for using eutectics as a fixed-point temperature has been carried out in metal-metal eutectics. There has been reported that a fixed-point temperature was realized by casting copper-silver eutectics or copper-aluminum eutectics in a graphite crucible and observing the melting and freezing thereof (Itoh, Papers of The Society of Instrumentation and Control Engineers, Vol. 19, No. 12, p. 978 (1983)).

The maximum temperature of conventional fixed-point crucibles which use graphite and to which pure metal is cast is the copper point of 1085° C. This is because that when a metal having a higher melting point is melted in a graphite crucible, the graphite is dissolved into the metal and the purity thereof is lowered so that the freezing point is dropped thereby.

Since the temperature scale maintained by the strip lamp or the radiation thermometer, which are employed because a fixed-point crucible above the copper point is not available, depends on the extrapolation, the accuracy of the temperature scale is greatly deteriorated. For example, in the traceability of radiation thermometers in Japan, the provided accuracy at 1085° C. is 0.3° C., whereas it is abruptly deteriorated to 4° C. at 1600° C. and to 8° C. at 2000° C.

Further, it requires enormous efforts to realize temperature scale in high accuracy such as the use of a radiation thermometer of high accuracy, the accurate evaluation of the characteristics of the radiation thermometer. However, since it still depends on the extrapolation, resulting uncertainty in temperature scale realization and maintenance is about 1.2° C. at 2000° C.

Further, since the emissivity of a strip is not 1 in the strip lamp, correction is needed depending upon a wavelength to be measured. Thus, not only it is difficult to use the strip lamp with high accuracy but also the strip lamp must be used with an inert gas enclosed therein because the tungsten of the ribbon is evaporated at a temperature above 2000° C. As a result, stable characteristics of the strip lamp cannot be obtained due to the convection of the inert gas.

For realizing the palladium point or the platinum point using the alumina crucible can be used in the measurement for a short period. However, it lacks practicality because a problem arises in that when the alumina crucible is repeatedly used, the crucible is broken. This is because the alumina is susceptible to thermal shock and made brittle thereby.

Sufficient accuracy cannot be obtained in the calibration of the thermocouple carried out by the palladium wire method. This is because reproducibility obtained thereby is only about 1° C. and that accuracy in interpolation is deteriorated because even the copper point as the nearest fixed-point is about 500° C. apart The method of melting alumina in the tungsten crucible is scarcely realized. This is because that the processability of tungsten is bad, it is difficult to enclose molten alumina into a lateral crucible and sufficient accuracy cannot be obtained since a blackbody cavity whose emissivity is near to 1 cannot be formed due to the low emissivity of the tungsten.

The method of using metal/metal eutectics serves the purpose of increasing the number of fixed-point temperatures in a temperature region lower than the copper point. Thus, when the same method is used in a temperature region higher than the copper point, a fixed-point temperature cannot be realized because a freezing point cannot help being lowered by the dissolving of graphite.

SUMMARY OF THE INVENTION

An objective of the present invention, which was made to overcome the problems of the conventional art and to realize fixed-point temperatures in a temperature region exceeding the copper point, is to enhance calibrating accuracy in the calibration of all the thermometers which are used in a high temperature region such as a radiation thermometer, a thermocouple and the like.

To achieve the above objective, a fixed-point crucible of the present invention comprises a crucible composed of carbon and having a blackbody cavity or a thermometer well formed therein, and a fixed-point material of high melting point enclosed in the wall of the crucible, wherein the fixed-point material is an eutectic structure of carbon and metal.

Any of iron, cobalt, nickel, palladium, rhodium, platinum, ruthenium, iridium, rhenium, and osmium may be suitably used as the metal used for the fixed-point crucible of the present invention.

A fixed-point temperature realizing apparatus of the present invention may dispose the fixed-point crucible in a temperature-variable furnace, and the temperature-variable furnace may include a heating device for increasing and decreasing the environmental temperature of the crucible and a temperature measuring means capable of measuring the temperature variation of the cavity in the crucible through a thermometer to be calibrated.

More specifically, the fixed-point temperature realizing apparatus of the present invention may use an electric furnace as the temperature-variable furnace, the fixed-point crucible may be accommodated in the electric furnace, the electric furnace may include a heating device composed of a tubular heater which is heated by electrical current flow, a heat insulator for covering the heater and an air tight casing for covering them, and the casing may include a vacuum suction means for evacuating the interior of the furnace to vacuum and an inert gas supply means.

As the tubular heater, a graphite furnace core tube, which is heated by direct current flow, may be used, or a heater element which surrounds an alumina furnace core tube, in which the fixed-point crucible is loaded, may be used.

As a temperature measuring means, a quartz glass sight hole for calibrating a radiation thermometer may be disposed at a position where the blackbody cavity of the crucible can be observed, or a thermometer inserted in alumina protective tube, which reaches the interior of the thermometer well of the crucible from the outside of the casing, may be disposed.

The temperature-variable furnace may be provided with a monitor thermometer for controlling heater power.

A thermometer calibrating method of the present invention using the fixed-point temperature measuring apparatus comprises the steps of disposing in a furnace a fixed-point crucible composed of carbon and a fixed-point material of high melting point enclosed in the wall of the crucible, wherein the fixed-point material is a eutectic structure of carbon and metal, melting and freezing the fixed-point material of high melting point by heating it in the furnace, measuring the temperature variation of the fixed-point material with a thermometer to be calibrated, and calibrating the thermometer based on observed plateaus.

A radiation thermometer, a thermocouple and a resistance thermometer may be particularly suitable as the thermometers to be calibrated by the fixed-point temperature measuring apparatus of the present invention. However, the thermometer to be calibrated is not limited thereto.

Since the above fixed-point temperature measuring crucible of the present invention uses a eutectic structure of carbon and metal as a fixed-point material, the temperature scale in a high temperature region, whose sufficient accuracy cannot be conventionally obtained because it depends on extrapolation from 1085° C. of the copper point, can be accurately realized.

According to the fixed-point temperature realizing apparatus and the temperature calibrating method using the apparatus of the present invention, since fixed-point temperatures in the high temperature region can be realized and thermometers such as the radiation thermometer, the thermocouple, the resistance thermometer and the like can be calibrated by interpolation, accuracy can be greatly improved.

The temperature scale can be maintained by only using fixed-points and a radiation thermometer without the use of a standard strip lamp which is conventionally used to maintain the temperature scale.

Further, since calibration can be carried out by interpolation, the accurate evaluation of the characteristics of a highly-accurate standard radiation thermometer, which is conventionally required, is unnecessary, whereby a calibration job is remarkably simplified and a system for providing a temperature scale can be upgraded.

Furthermore, the palladium wire method is unnecessary in the calibration of the thermocouple. In addition, in the development of a high temperature thermocouple which is carried out hereinafter, the characteristics of the thermocouple such as the stability, the variation among different thermocouples, and the like can be evaluated with high accuracy, which can also contribute to the improvement of the characteristics of the thermocouple.

DESCRIPTION OF EMBODIMENTS

Embodiments of a fixed-point crucible, a fixed-point temperature measuring apparatus using the crucible and a temperature calibrating method using the apparatus according to the present invention will be described below with reference to the drawings.

Figure 1:
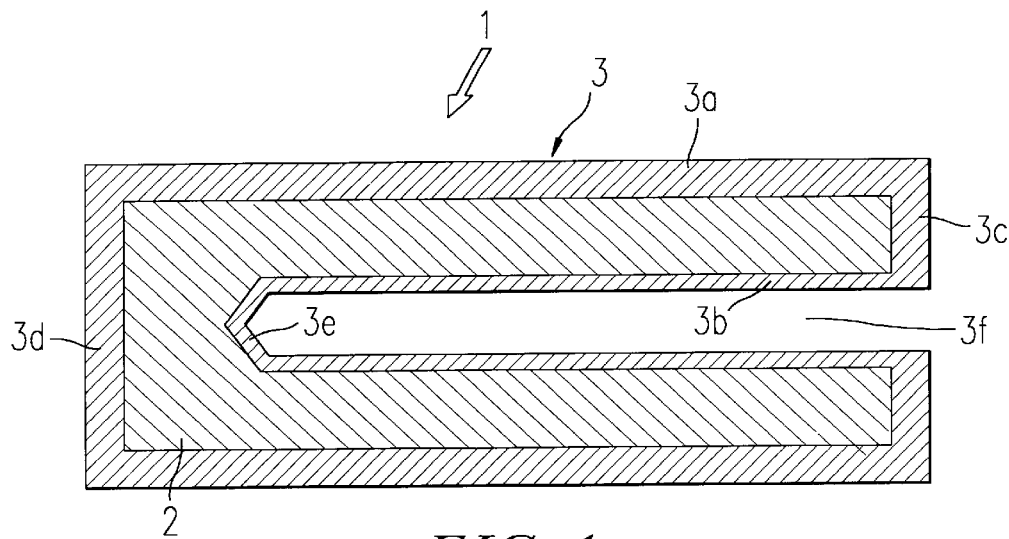
FIG. 1 is a sectional view showing an embodiment of a fixed-point crucible according to the present invention.

FIG. 1 is a sectional view showing an embodiment of the fixed-point crucible according to the present invention.

In FIG. 1, the fixed-point crucible 1 is composed of a graphite crucible 3 and an eutectic structure of carbon and metal 2 enclosed in the wall of the crucible 3 and uses the temperature of the melting point and the freezing point of the eutectic structure of carbon and metal 2 as a fixed-point temperature.

To describe the fixed-point crucible in more detail, the wall of the graphite crucible 3 has a hollow double-walled cylindrical shape concentrically including an outer cylinder 3a and an inner cylinder 3b. The outer cylinder 3a and the inner cylinder 3b are coupled with each other at ends thereof through an end wall 3c, and the other ends of the outer cylinder 3a and the inner cylinder 3b are closed with end walls 3d and 3e disposed at intervals respectively. The eutectic structure of carbon and pure metal 2 as a fixed-point material is cast and enclosed in the spaces between the outer cylinder 3a and the inner cylinder 3b and between the end wall 3d and the end wall 3e. Then, the interior of the inner cylinder 3b is arranged as a fixed-point temperature measuring blackbody cavity or thermometer well 3f.

The fixed-point crucible 1 calibrates a thermometer to be calibrated by disposing the crucible 1 in a temperature-variable electric furnace, observing the temperature variation in the fixed-point crucible 1 with the thermometer when an environmental temperature is increased and decreased and making use of the phenomenon that the temperature variation disappears due to latent heat in melting in a state that the eutectic structure 2 in the fixed-point crucible 1 coexists in a liquid phase and a solid phase as described below.

Various types of thermometers to be used at high temperature such as a radiation thermometer, a thermocouple, a resistance thermometer and the like can be used as the thermometer to be calibrated.

Metal materials which form carbon eutectics whose melting point is higher than the copper point are used as a metal material used for the eutectic structure of carbon and metal 2 of the fixed-point crucible 1. Specifically, iron, cobalt, nickel, palladium, rhodium, platinum, ruthenium, iridium, rhenium, and osmium are suitable as the metal material.

Figure 2:
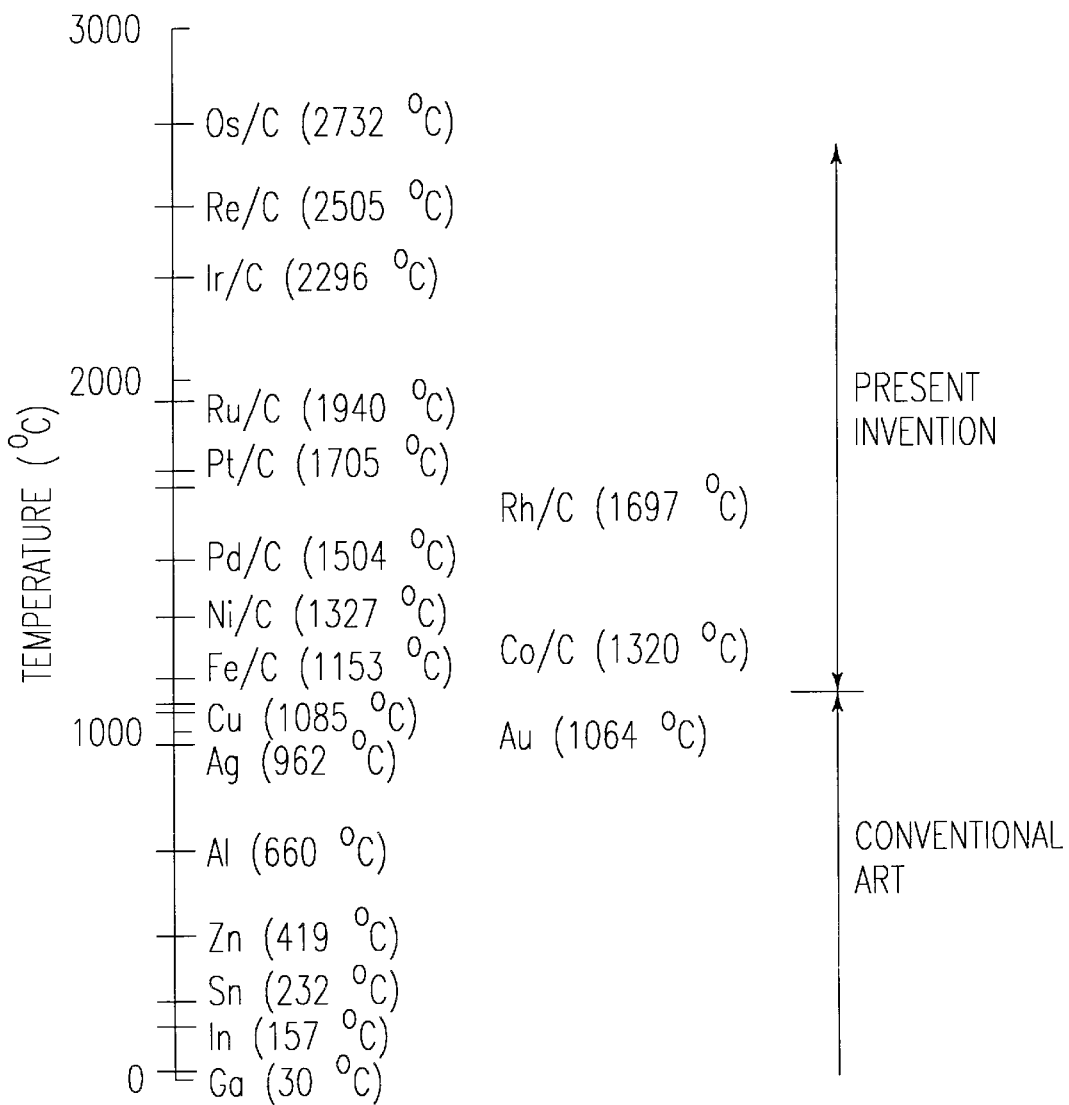
FIG. 2 is a view showing the fixed-point temperature of metal-carbon eutectics used in the present invention and a conventionally used pure metal fixed-point temperature.
Figure 3:
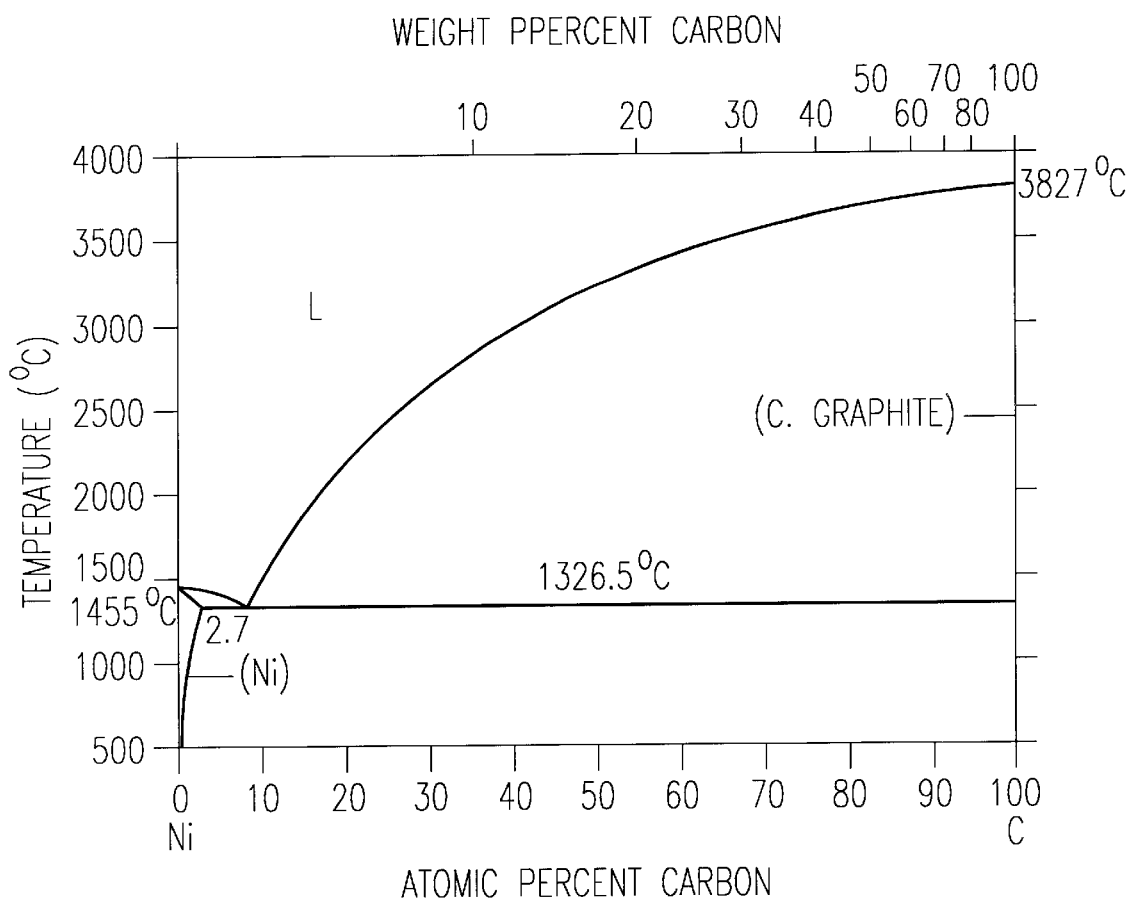
FIG. 3 is the nickel-carbon binary alloy phase diagram as an example of a metal-carbon binary alloy phase diagram according to the present invention.

FIG. 2 is a view showing the fixed-point temperature of metal-carbon eutectics used in the present invention and a conventionally used pure metal fixed-point temperature, and FIG. 3 is a view showing a nickel-carbon binary alloy phase diagram as an example of a metal-carbon binary alloy phase diagram according to the present invention.

Next, the operation of the fixed-point crucible of the present invention will be described with reference to FIG. 2 and FIG. 3.

While the freezing point of pure nickel is 1455° C., it can be found from the figures that the eutectic used in the present invention has a fixed-point temperature at 1326.5° C. in a composition ratio containing 3.0 wt % of carbon.

For example, when nickel-carbon eutectic composed of nickel to which 3.0 wt % of carbon is added is used as a fixed-point material, if the nickel-carbon eutectic is heated and the temperature thereof exceeds its melting point, graphite as a crucible material is slightly dissolved into the eutectic metal. However, when the temperature of the nickel-carbon eutectic is decreased again, the composition ratio of the eutectic is recovered when the freezing-point is reached because excessive graphite is precipitated. As a result, melting and freezing plateaus of good reproducibility can be observed.

Since the eutectic is composed of graphite, which is the crucible material, and pure-metal, the crucible material is intrinsically free from impurities from the crucible, thus the freezing point does not drop. Further, since graphite is used, the problem of the durability of a crucible, which is arisen when an alumina crucible is used, is not caused. Furthermore, when the nickel-carbon eutectic, to which carbon was previously added, is melted at the eutectic composition ratio thereof, graphite is dissolved from the crucible only in a slight amount and the durability of the crucible is not deteriorated by the melt of the crucible.

Further, since graphite having high emissivity is used as the crucible material, the blackbody cavity 3f having sufficiently high emissivity can be easily formed and the cavity 3f is also suitable for the calibration of a radiation thermometer.

Since a thermometer, which was calibrated at the fixed-point temperatures shown in FIG. 2, is calibrated by interpolation up to a high temperature region of 2732° C., the calibration accuracy thereof can be greatly improved. Further, even if the thermometer is calibrated by extrapolation using any of the fixed-point temperatures, extrapolation accuracy can be greatly improved as compared with a conventional method because the calibration is carried out at a temperature higher than the copper point.

Figure 4:
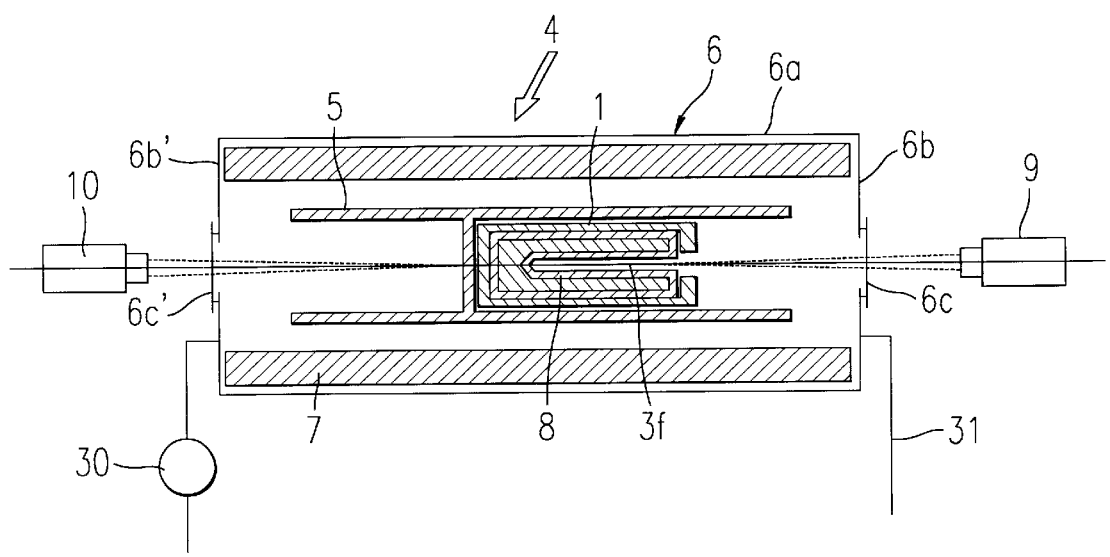
FIG. 4 is a sectional view showing an embodiment of a fixed-point temperature realizing apparatus according to the present invention.
Figure 5:
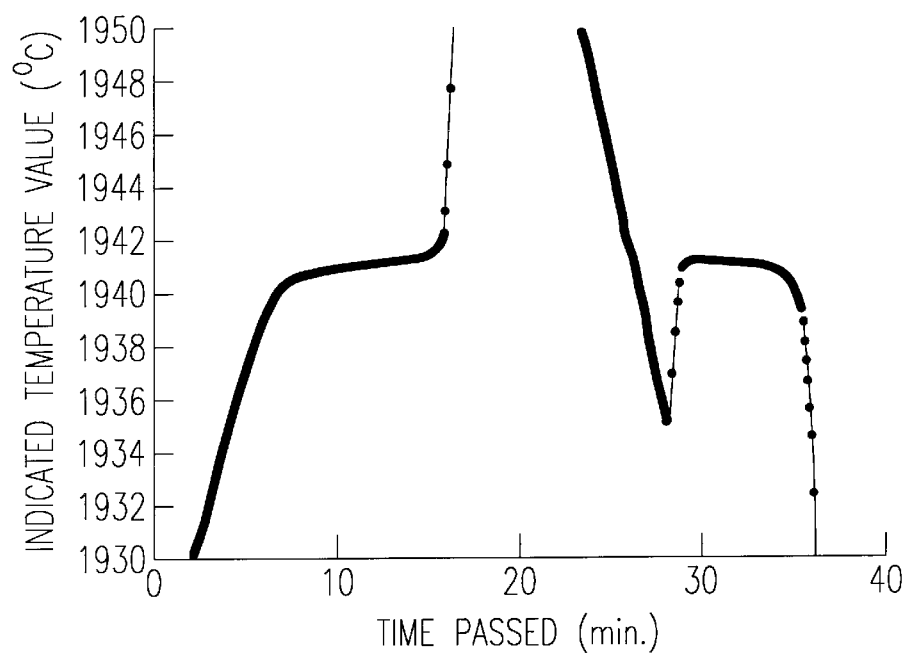
FIG. 5 is a view showing an example of an output from a thermometer to be calibrated according to the embodiment of FIG. 4.

FIG. 4 shows an embodiment of a fixed-point temperature realizing apparatus using the fixed-point crucible according to the present invention and FIG. 5 shows an example of an output from a thermometer to be calibrated according to the embodiment of FIG. 4.

In the fixed-point temperature realizing apparatus of the embodiment, basically, the fixed-point crucible 1 is disposed in a temperature-variable electric furnace 4, which is provided with a heating device for increasing and decreasing the environmental temperature of the crucible 1 and further with a temperature measuring means capable of measuring the temperature variation of the blackbody cavity 3f in the crucible with a thermometer. In the fixed-point crucible a ruthenium-carbon eutectic structure composed of, for example, ruthenium to which 1.2 wt % of carbon is added can be used as the fixed-point material.

The temperature-variable electric furnace 4 accommodates the fixed-point crucible 1 therein and includes a tubular heater, which is formed of a graphite furnace core tube 5 which is heated by direct current flow, a heat insulator 7 for covering it and an air tight casing 6 for accommodating them. The casing 6 is provided with a vacuum suction means 30 composed of a vacuum pump for evacuating the interior of the furnace to vacuum and an inert gas supply means 31 composed of a piping connected to a gas supply source. Then, after the interior of the temperature-variable electric furnace 4 is evacuated to vacuum as a whole, the interior thereof is set to an inert gas atmosphere and the temperature of the furnace is measured.

The casing 6 includes a cylindrical casing main body 6a and lid portions 6b and 6b' for covering both the ends of the casing main body 6a. Further, the casing 6 is provided with a quartz glass sight hole 6c for calibrating a radiation thermometer 9. The quartz glass sight hole 6c acts as a temperature measuring means for measuring the temperature of the blackbody cavity 3f with the radiation thermometer to be calibrated and is located at the center of the lid portion 6b a position where the blackbody cavity 3f of the crucible 1 can be observed. Further, a quartz glass sight hole 6c' is also disposed to the other lid portion 6b' and a monitor radiation thermometer 10 is disposed externally of the quartz glass sight hole 6c' to control the energization of the heater. The quartz glass sight holes 6c and 6c' may be merely sight holes.

The radiation thermometer 9 to be calibrated measures the temperature of the fixed-point crucible by detecting the light radiated from the blackbody cavity 3f of the fixed-point crucible 1 through the quartz glass sight hole 6c. Further, the monitor radiation thermometer 10 monitors the temperature of the interior of the electric furnace 4 arid controls the power by inputting the signal output from the monitor radiation thermometer 10 to the controller of a heater heating current.

Further, a heat insulator 8 is inserted around the fixed-point crucible 1 for the purpose of increasing the uniformity of a temperature distribution and improving the electrical insulation between the graphite furnace core tube 5 and the fixed-point crucible 1.

The output from the radiation thermometer 9 to be calibrated in the above embodiment is shown in FIG. 5.

FIG. 5 shows that melting and freezing plateaus can be observed, from which it can be found that a thermometer can be calibrated at the fixed-point temperature.

Figure 6:
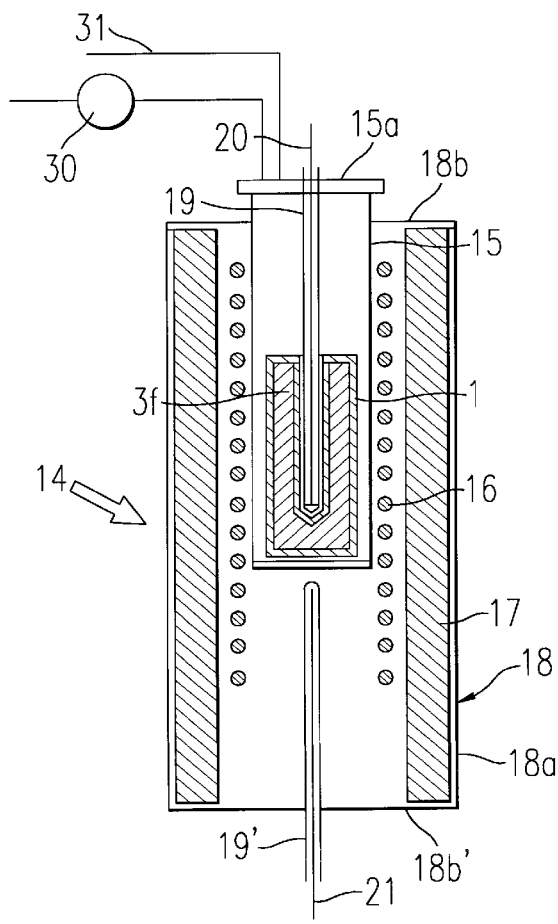
FIG. 6 is a sectional view showing another embodiment of the fixed-point temperature realizing apparatus according to the present invention.
Figure 7:
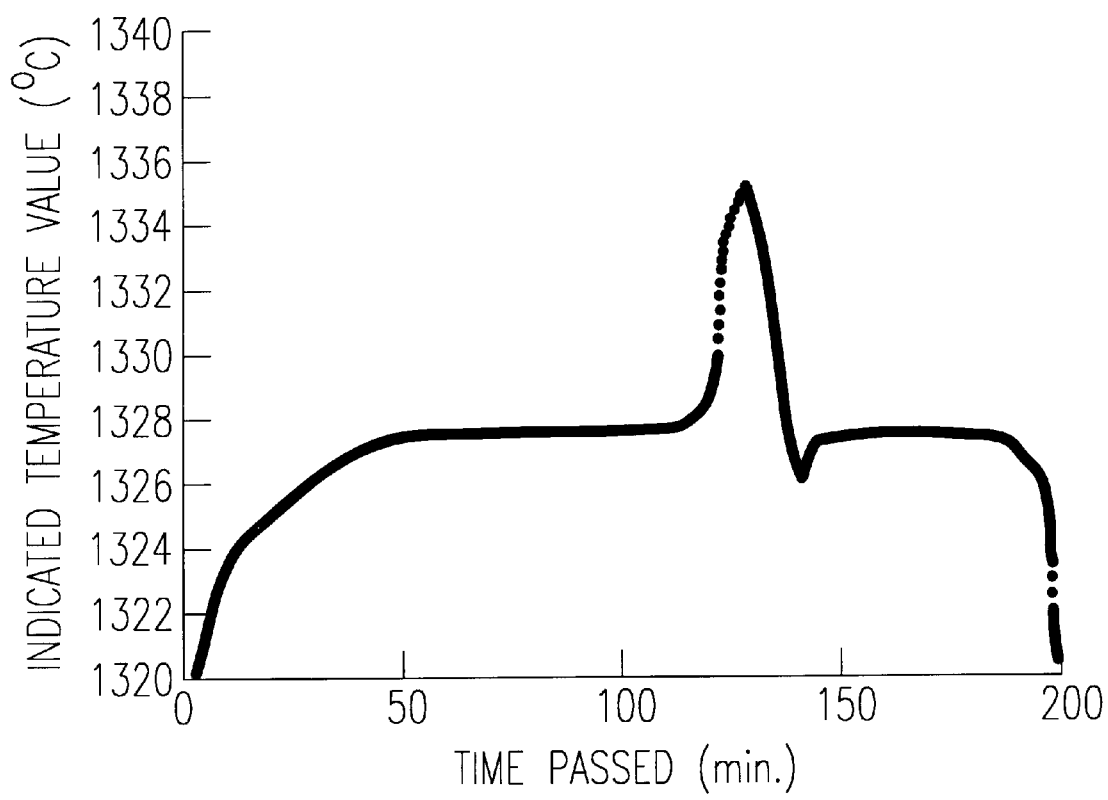
FIG. 7 is a view showing an example of an output from a thermometer to be calibrated according to the embodiment of FIG. 6.

FIG. 6 and FIG. 7 shows another embodiment of the fixed-point temperature realizing apparatus using the fixed-point crucible according to the present invention.

A fixed-point crucible 1 used in the embodiment shown in FIG. 6 is similar to the fixed-point crucible shown in FIG. 1. However, nickel-carbon eutectic composed of, for example, nickel to which 3.0 wt % of carbon is added can be used by being cast as a fixed-point material in the graphite crucible 1.

In the fixed-point temperature measuring apparatus of the embodiment, the fixed-point crucible 1 is loaded in a vertical temperature-variable electric furnace 14. The electric furnace 14 includes an alumina furnace core tube 15 in which the fixed-point crucible 1 is loaded, a heater element 16 which is disposed so as to surround the alumina furnace core tube 15 and heated by electrical current flow, a heat insulator 17 for further surrounding the heater element 16 and a casing 18 for accommodating them.

The casing 18 is composed of a cylindrical casing main body 18a and lid portions 18b and 18b' disposed so as to cover both the ends of the casing main body 18a. The alumina furnace core tube 15 is inserted into the casing 18 through the lid portion 18b.

The alumina furnace core tube 15 has a cylindrical shape with its inner end closed and its outer end is covered with a lid member 15a having a small opening located at the center thereof. Then, a thermometer inserting alumina protective tube 19 is disposed as a temperature measuring means for measuring the temperature of a cavity 3f of the crucible 1 with a thermometer to be calibrated. The alumina protective tube 19 reaches the interior of the blackbody thermometer well 3f from the outside of the casing 18 through the small opening of the lid member 15a. A thermocouple 20 to be calibrated can be inserted into the alumina protective tube 19.

The furnance 14 is provided with a vacuum suction means 30 composed of a suction pump for evacuating the interior of the furnace core tube 15 to vacuum and an inert gas supply means 31 composed of a piping connected to a gas supply source, similarly to the embodiment of FIG. 4. Then, after the interior of the furnace tube 15 is evacuated to vacuum as a whole, the interior thereof is set to an inert gas atmosphere and the temperature of the furnace is measured.

Further, an alumina protective tube 19' is inserted into the temperature variable electric furnace 14 from under the furnace 14 through the lid portion 18b'. A monitor thermocouple 21 for controlling the energization of the heater element is inserted into the alumina protective tube 19'.

Then, the furnace temperature of the temperature variable electric furnace 14 is monitored with the monitor thermocouple 21, the signal output from the monitor thermocouple 21 is supplied to the controller of the heater element 16 so that the furnace temperature of the temperature-variable electric furnace 14 is controlled by controlling a current supplied to the heater element 16.

Note that the heater element 16 is separately controlled in the three zones thereof divided into an upper zone, an intermediate zone and a lower zone to increase the uniformity of the temperature distribution around the fixed-point temperature measuring crucible.

The casing 6 and furnace tube 15 in the embodiment shown in FIGS. 4 and 6 respectively are formed air tight, however these do not have to be necessarily air tight, and the vacuum suction means 30 for evacuating the interior of the furnance to vacuum is not necessarily needed.

FIG. 7 shows the output from the thermocouple to be calibrated 20 in the above embodiment.

FIG. 7 shows that melting and freezing plateaus can be observed, from which it can be found that thermometer can be calibrated at the fixed-point temperature.

As apparent from the above-mentioned, the thermometer calibrating method carried out by the fixed-point temperature realizing apparatuses of the above respective embodiments is such that the fixed-point crucible, whose fixed-point material is a eutectic structure of carbon and metal, is placed in the temperature-variable furnace, the fixed-point material of high melting point is melted and frozen by being heated by the furnace as shown in FIG. 5 and FIG. 7, the temperature variation of the fixed-point material is measured with the thermometer to be calibrated and the thermometer is calibrated based on observed plateaus.

While the present invention has been described with reference to the embodiments, the present invention is by no means limited to the above embodiments and it goes without saying that the present invention can be embodied within the scope thereof disclosed in claims. While thermometers to be calibrated are, for example, the radiation thermometer, the thermocouple and the resistance thermometer as described above, they are not limited thereto and any thermometers can be calibrated so long as they are used in a high temperature region, and for example, a fiber-optic thermometer and the like can be also calibrated by the present invention.

What is claimed is:

1. A fixed-point crucible, comprising:
   a crucible composed of carbon and having a cavity formed therein; and
   a fixed-point material of high melting point enclosed in a wall of the crucible,
   wherein the fixed-point material is a eutectic structure of carbon and metal.

2. A fixed-point crucible according to claim 1, wherein the metal is any of iron, cobalt, nickel, palladium, rhodium, platinum, ruthenium, iridium, rhenium, and osmium.

3. A fixed-point temperature realizing apparatus using a fixed-point crucible according to claim 1 or claim 2, comprising a temperature-variable furnace having the fixed-point crucible disposed therein, wherein the temperature-variable furnace includes a heating device for increasing and decreasing the environmental temperature of the crucible and a temperature measuring means capable of measuring the temperature variation of the cavity in the crucible through a thermometer.

4. A fixed-point temperature realizing apparatus according to claim 3, wherein the thermometer is any of a radiation thermometer, a thermocouple and a resistance thermometer.

5. A fixed-point temperature realizing apparatus according to claim 3, wherein an electric furnace is used as said temperature-variable furnace, the fixed-point crucible is accommodated in the electric furnace, the electric furnace includes a tubular heating device, a heat insulator for covering the heating device and a casing for covering them, and the casing includes an inert gas supply means for inert gas displacement in the interior of the furnace.

6. A fixed-point temperature realizing apparatus according to claim 5, wherein a graphite furnace core tube which is heated by direct current flow is used as the tubular heating device.

7. A fixed-point temperature realizing apparatus according to claim 5, wherein an alumina furnace core tube in which the fixed-point crucible is loaded and a heater element surrounding thereof are used as the tubular heating device.

8. A fixed-point temperature realizing apparatus according to claim 5, wherein a sight hole for calibrating a radiation thermometer is disposed at a position where the cavity of the crucible can be observed by a temperature measuring means.

9. A fixed-point temperature realizing apparatus according to claim 5, wherein a thermometer inserted in an alumina protective tube, which reaches the interior of the cavity of the crucible from the outside of the casing, is disposed as a temperature measuring means.

10. A thermometer calibrating method, comprising the steps of:

disposing a fixed-point crucible composed of carbon and a fixed-point material of high melting point enclosed in the wall of the crucible, wherein the fixed-point material is a eutectic structure of carbon and metal;

melting and freezing the fixed-point material of high melting point by heating it in the furnace;

measuring the temperature variation of the fixed-point material with a thermometer to be calibrated; and calibrating the thermometer based on observed plateaus.

* * * * *